United States Patent
Felix Frias

(10) Patent No.: US 10,155,492 B2
(45) Date of Patent: Dec. 18, 2018

(54) RAINWATER RECYCLING SYSTEM AND METHOD

(71) Applicant: FORD GLOBAL TECHNOLOGIES, LLC, Dearborn, MI (US)

(72) Inventor: Carlos Humberto Felix Frias, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 15/261,283

(22) Filed: Sep. 9, 2016

(65) Prior Publication Data

US 2018/0072253 A1   Mar. 15, 2018

(51) Int. Cl.
| | | |
|---|---|---|
| *B60R 16/08* | (2006.01) | |
| *B60R 13/07* | (2006.01) | |
| *E03B 3/02* | (2006.01) | |
| *F01N 5/02* | (2006.01) | |
| *B60N 3/18* | (2006.01) | |

(52) U.S. Cl.
CPC ............ *B60R 16/08* (2013.01); *B60N 3/18* (2013.01); *B60R 13/07* (2013.01); *E03B 3/02* (2013.01); *F01N 5/02* (2013.01)

(58) Field of Classification Search
CPC .......... B60R 13/07; B60R 16/08; B60H 1/18; B60N 3/18; E03B 3/02; F01N 5/02; F02G 5/02; B62D 25/07
USPC ....... 137/334, 336, 340, 343, 351, 354, 899; 126/19.5, 271.1
See application file for complete search history.

(56) References Cited

U.S. PATENT DOCUMENTS

| | | | | |
|---|---|---|---|---|
| 2,467,156 A | * | 4/1949 | Sala | B60N 3/16 126/19.5 |
| 3,148,675 A | * | 9/1964 | Menuto | B60H 1/20 126/19.5 |
| 3,785,359 A | * | 1/1974 | Whittaker | B60S 1/487 126/19.5 |
| 4,055,279 A | * | 10/1977 | Lapera | B60N 3/18 137/354 |
| 4,368,915 A | | 1/1983 | Torii | |
| 4,694,891 A | * | 9/1987 | Okumura | B60S 1/481 165/41 |
| 4,771,822 A | * | 9/1988 | Barbosa | B60C 23/18 123/41.01 |
| 4,892,351 A | | 1/1990 | Ono et al. | |

(Continued)

FOREIGN PATENT DOCUMENTS

| | | |
|---|---|---|
| CA | 2246399 A1 | 3/1999 |
| CN | 201506306 U | 6/2010 |

(Continued)

OTHER PUBLICATIONS

English Machine Translation of CN201506306U.

(Continued)

*Primary Examiner* — Matthew W Jellett
*Assistant Examiner* — Jonathan Waddy
(74) *Attorney, Agent, or Firm* — Jason Rogers; King & Schickli, PLLC

(57) ABSTRACT

A rainwater recycling system for a motor vehicle includes a rainwater collector, a rainwater reservoir connected to the rainwater collector and a heat exchanger to heat rainwater in the rainwater reservoir. A related method of recycling rainwater is also disclosed.

8 Claims, 2 Drawing Sheets

(56) References Cited

U.S. PATENT DOCUMENTS

| | | | |
|---|---|---|---|
| 8,252,174 B2 | 8/2012 | Jones et al. | |
| 8,322,330 B2 * | 12/2012 | Liu | F01N 5/02 122/3 |
| 2004/0113466 A1 | 6/2004 | Allan et al. | |
| 2005/0235979 A1 * | 10/2005 | Whittaker | B60S 1/487 126/19.5 |
| 2008/0190288 A1 * | 8/2008 | Chu | B01D 47/06 95/24 |
| 2013/0206266 A1 | 8/2013 | Stenhouse | |
| 2014/0134056 A1 * | 5/2014 | Shinoda | B01D 53/66 422/122 |

FOREIGN PATENT DOCUMENTS

| | | |
|---|---|---|
| CN | 201863807 U | 6/2011 |
| DE | 202007003761 U1 | 5/2007 |
| GB | 2315251 A | 1/1998 |

OTHER PUBLICATIONS

English Machine Translation of CN201863807U.
English Machine Translation of DE202007003761U1.
Jorge Chapa, "Transportation Tues: The Mazda Kiyora Car Purifies Water," http://inhabitat.com/mazda-kiyora-concept-car/, Oct. 7, 2008.

\* cited by examiner

RAINWATER RECYCLING SYSTEM AND METHOD

TECHNICAL FIELD

This document relates generally to the motor vehicle equipment field and, more particularly, to a rainwater recycling system for a motor vehicle as well as to a related method for recycling rainwater.

BACKGROUND

When camping or partaking in other outdoor activities having ready access to water may be a significant concern. This document relates to a rainwater recycling system and related method for recycling rainwater. The system and method provide for the collecting of rainwater through a rainwater collector provided on the motor vehicle. That rainwater is stored in a reservoir where it may be heated for showering or other purposes as well as filtered prior to use.

SUMMARY

In accordance with the purposes and benefits described herein, a rainwater recycling system is provided for a motor vehicle. That rainwater recycling system includes a rainwater collector, a rainwater reservoir connected to the rainwater collector and a heat exchanger to heat rainwater in the rainwater reservoir. The heat exchanger may include an exhaust gas conduit allowing one to heat the rainwater in the water reservoir by means of exhaust gases emitted by the internal combustion engine of the motor vehicle.

The rainwater recycling system may further include a bypass conduit and a bypass valve. The bypass valve may have an exhaust gas inlet for receiving exhaust gases from the internal combustion engine of the motor vehicle, a first outlet connected to the exhaust gas conduit of the heat exchanger and a second outlet connected to the bypass conduit.

The bypass valve may be temperature responsive to direct exhaust gases from the internal combustion engine of the motor vehicle (a) to the exhaust gas conduit of the heat exchanger when the temperature of the rainwater in the rainwater reservoir is below a predetermined temperature and (2) to the bypass conduit upstream of the heat exchanger when the temperature of the rainwater in the rainwater reservoir is above a predetermined temperature or when no heating of the rainwater in the rainwater reservoir is desired.

The rainwater recycling system may further include a rainwater dispenser. In addition, the rainwater recycling system may also include a water filter upstream of the rainwater dispenser for filtering the rainwater prior to dispensing from the rainwater reservoir.

In some embodiments the rainwater recycling system may further include a rainwater temperature sensor for monitoring the temperature of the rainwater in the rainwater reservoir. Further, the rainwater recycling system may include a controller configured to control operation of the bypass valve in response to the temperature sensor. Thus, exhaust gases from an internal combustion engine of the motor vehicle may be directed (1) to the exhaust gas conduit of the heat exchanger when the temperature of the rainwater in the rainwater reservoir is below a predetermined or desired temperature and (2) to the bypass conduit upstream from the heat exchanger when the temperature of the rainwater in the rainwater reservoir is above a predetermined temperature or when no heating of the rainwater in the rainwater reservoir is desired.

In accordance with an additional aspect, a method is provided of recycling rainwater. That method comprises the steps of: (a) collecting rainwater by a rainwater collector provided on a motor vehicle, (b) storing collected rainwater in a rainwater reservoir carried on the motor vehicle and (c) heating the rainwater stored in the rainwater reservoir.

The method may further include the step of circulating hot exhaust gases from an internal combustion engine of the motor vehicle through a heat exchanger to heat the rainwater stored in the rainwater reservoir. Further, the method may include monitoring the temperature of the rainwater in the rainwater reservoir.

In addition, the method may include the step of directing, by bypass valve, hot exhaust gases through a bypass conduit around the heat exchanger when the temperature of the rainwater in the rainwater reservoir is above a predetermined temperature. In addition, the method may include the step of dispensing rainwater from the rainwater reservoir. Further, the method may include the step of filtering the rainwater, by a filter, prior to dispensing.

In the following description, there are shown and described several preferred embodiments of the rainwater recycling system and the related rainwater recycling method. As it should be realized, the system and method capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the rainwater recycling system and together with the description serve to explain certain principles thereof. In the drawing figures.

Reference will now be made in detail to the present preferred embodiments of the rainwater recycling system, an example which are illustrated in the accompanying drawing figures.

DETAILED DESCRIPTION

Figure 1:
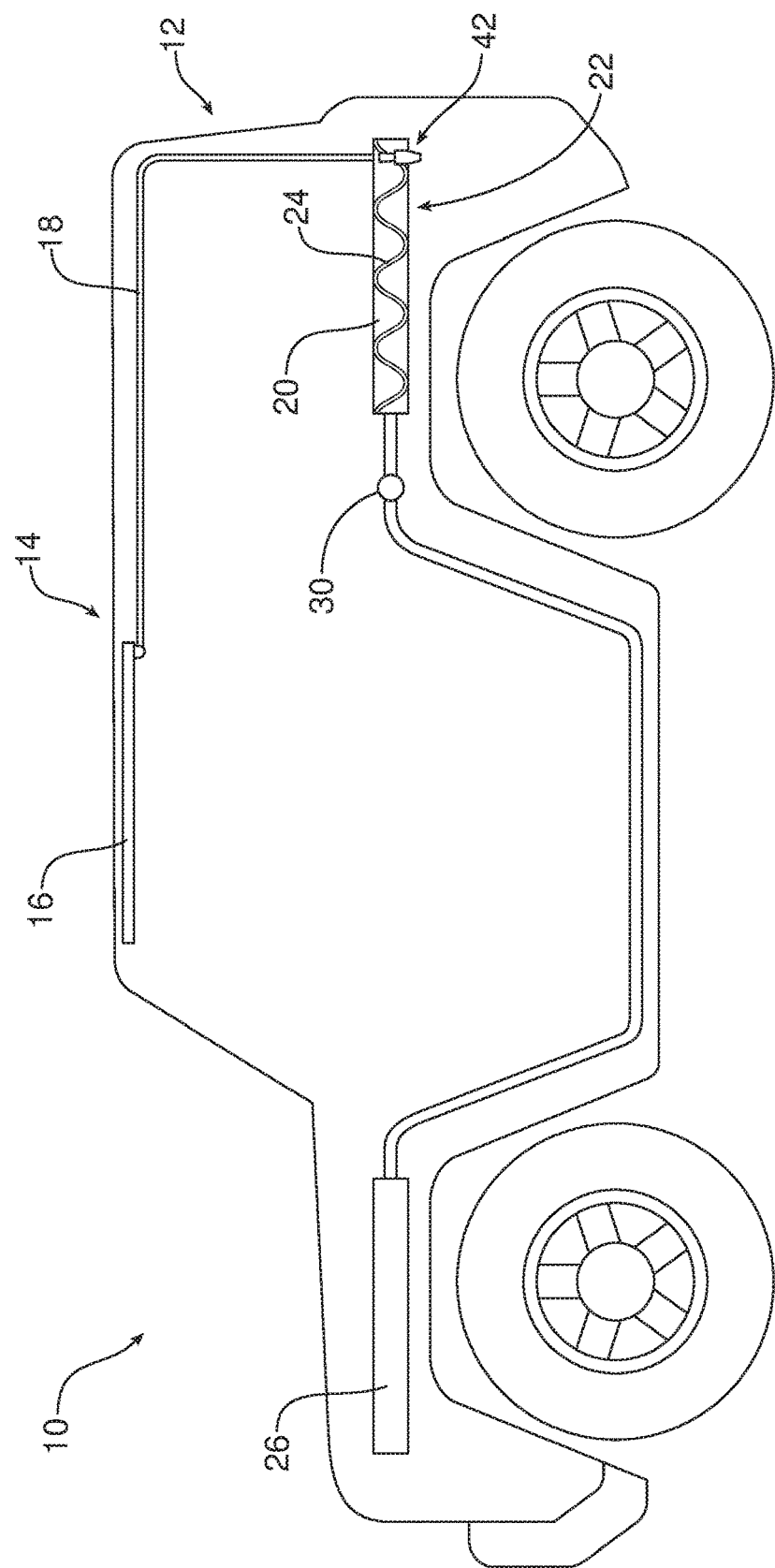
FIG. 1 is a schematic view of a motor vehicle equipped with the rainwater recycling system.

FIG. 1 illustrates a motor vehicle 10 equipped with a rainwater recycling system 12. That rainwater recycling system 12 is illustrated in detail in FIG. 2.

The rainwater recycling system 12 includes a rainwater collector generally designated by reference numeral 14. In the embodiment illustrated in FIGS. 1 and 2, the rainwater collector 14 comprises a roof water management system 16 that directs water from the roof of the motor vehicle into drain tubes 18 that function to convey that rainwater to a rainwater reservoir 20 where the rainwater is stored for use. A heat exchanger 22 is provided to heat the rainwater in the rainwater reservoir 20 to a desired temperature. In the illustrated embodiment, the heat exchanger 22 includes an exhaust gas conduit 24 that extends through the rainwater reservoir 20 and provides a pathway for the passage of hot exhaust gases from the internal combustion engine 26 of the motor vehicle 10.

In order to allow temperature control, the rainwater recycling system 12 may further include a bypass conduit 28 and a bypass valve 30. The bypass valve 30 has an exhaust gas inlet 32 to receive exhaust gases from the internal combustion engine 26, a first outlet 34 connected to the exhaust gas conduit 24 of the heat exchanger 22 and a second outlet 36 connected to the bypass conduit 28.

In one possible embodiment of the rainwater recycling system 12, the bypass valve 30 is temperature responsive to direct exhaust gases from the internal combustion engine 26 of the motor vehicle 10 (1) to the exhaust gas conduit 24 of the heat exchanger 22 when the temperature of the rainwater in the rainwater reservoir 20 is below a predetermined temperature and (2) to the bypass conduit 28 when the temperature of the rainwater in the rainwater reservoir is above a predetermined temperature. Thus, it should be appreciated that the bypass valve 30 is operative to maintain the rainwater in the rainwater reservoir 20 at a desired temperature. When the rainwater in the rainwater reservoir 20 is below the desired temperature, it is heated by the passage of hot exhaust gases through the exhaust gas conduit 24. In contrast, when the rainwater in the rainwater reservoir 20 is at or above the desired temperature, the hot exhaust gases from the internal combustion engine 26 are directed by the bypass valve 30 upstream from the rainwater reservoir through the bypass conduit 28 which is remote from the rainwater reservoir 20.

Some embodiments of the rainwater recycling system 12 include a rainwater temperature sensor 38 for monitoring the temperature of the rainwater in the rainwater reservoir 20. A controller 40 may also be provided. Controller 40 is responsive to the temperature sensor 38.

Controller 40 may comprise a computing device such as a dedicated microprocessor or an electronic control unit (ECU) operating in accordance with instructions received form appropriate control software. Thus, the controller 40 may comprise one or more processors, one or more memories and one or more network interfaces all communicating with each other over a communication bus. The controller 40 may be configured to control the operation of the bypass valve 30 in response to the rainwater temperature sensor 38 in the manner previously described.

Figure 2:
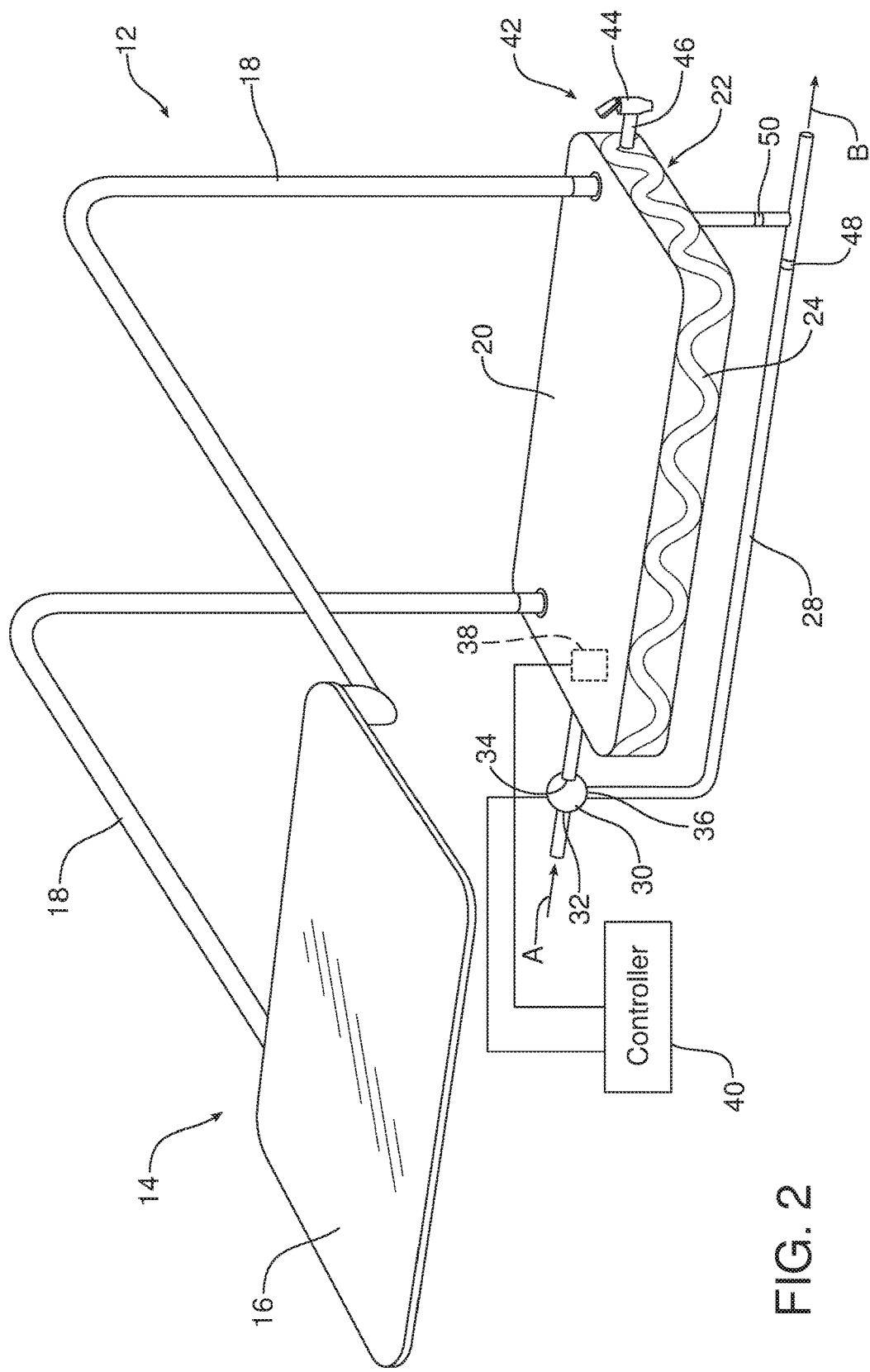
FIG. 2 is a detailed schematic view of that rainwater recycling system illustrated in FIG. 1.

As further illustrated in FIGS. 1 and 2, the rainwater recycling system 12 may also include a rainwater dispenser 42 including, for example, a spigot 44. The spigot 44 may be provided on the motor vehicle 10 at a conveniently accessed location. In one possible embodiment the spigot 44 could be provided behind an access door on the rear quarter panel or rear fascia of the motor vehicle 10. In addition, the rainwater recycling system 12 may include a water filter 46 upstream of the spigot 44 so that the rainwater being dispensed from the rainwater reservoir 20 may be filtered prior to use.

As should be appreciated, the rainwater recycling system 12 is associated with a method of recycling rainwater which comprises the steps of: (a) collecting rainwater by a rainwater collector 14 provided on a motor vehicle 10 (b) storing collected rainwater in a rainwater reservoir 20 carried on the motor vehicle and (c) heating the rainwater stored in the rainwater reservoir to a desired or predetermined temperature. That temperature may be selected by the operator and maintained through operation of the controller 40 which regulates the opening and closing of the bypass valve 30.

As previously described, the method may include circulating hot exhaust gases from an internal combustion engine 26 of the motor vehicle 10 through a heat exchanger 22 to heat the rainwater stored in the rainwater reservoir 20. Further, the method may include monitoring the temperature of the rainwater in the rainwater reservoir 20 by means of the temperature sensor 38. Further, the method may include directing, by means of a bypass valve 30, hot exhaust gas, through the exhaust gas conduit 24 of the heat exchanger 22 when it is desired to heat the rainwater in the rainwater reservoir 20. Further, the method may include directing, by the bypass valve 30, hot exhaust gases through the bypass conduit 28 around the heat exchanger 22 and the rainwater reservoir 20 when the rainwater in the rainwater reservoir is above the predetermined or desired temperature. One-way flow control valves 48, 50 may be provided at the locations shown in order to ensure exhaust gases always flow in the desired direction (note action arrows A and B in FIG. 2).

Still further, the method may include the step of dispensing the rainwater from the rainwater reservoir 20 by means of the rainwater dispenser 42. In addition the method may include the step of filtering the rainwater by means of the filter 46, prior to dispensing.

The foregoing has been presented for purposes of illustration and description. It is not intended to be exhaustive or to limit the embodiments to the precise form disclosed. Obvious modifications and variations are possible in light of the above teachings. For example, the embodiment of the rainwater recycling system 12 illustrated in the drawing figures and described above includes a heat exchanger to heat the rainwater with the hot exhaust gases generated by the internal combustion engine of the motor vehicle. The rainwater could be heated with a heat exchanger that utilizes a heating coil, a resistive heating element or some other means. All such modifications and variations are within the scope of the appended claims when interpreted in accordance with the breadth to which they are fairly, legally and equitably entitled.

What is claimed:

1. A rainwater recycling system for a motor vehicle, comprising:
   a rainwater collector;
   a rainwater reservoir connected to said rainwater collector;
   a heat exchanger, said heat exchanger including an exhaust gas conduit extending through said rainwater reservoir to heat rainwater in said rainwater reservoir; and
   a bypass conduit; and
   a bypass valve having an exhaust gas inlet, a first outlet connected to said exhaust gas conduit of said heat exchanger and a second outlet connected to said bypass conduit wherein said bypass valve is temperature responsive to direct exhaust gases from an internal combustion engine of said motor vehicle (1) to said exhaust gas conduit of said heat exchanger when a temperature of said rainwater in said rainwater reservoir is below a predetermined temperature and (2) to said bypass conduit upstream of said heat exchanger when said temperature of said rainwater in said rainwater reservoir is above said predetermined temperature.

2. The rainwater recycling system of claim 1, further including a rainwater dispenser.

3. The rainwater recycling system of claim 2, further including a water filter upstream of said rainwater dispenser.

4. The rainwater recycling system of claim 1, further including a rainwater temperature sensor for monitoring said temperature of said rainwater in said rainwater reservoir.

5. The rainwater recycling system of claim 4, further including a controller configured to control operation of said bypass valve in response to said rainwater temperature sensor whereby exhaust gases from said internal combustion engine of said motor vehicle are directed (1) to said exhaust gas conduit of said heat exchanger when temperature of said rainwater in said rainwater reservoir is below said predetermined temperature and (2) to said bypass conduit upstream from said heat exchanger when said temperature of said rainwater in said rainwater reservoir is above said predetermined temperature.

6. A method of recycling rainwater, comprising:
   collecting rainwater by a rainwater collector provided on a motor vehicle;
   storing collected rainwater in a rainwater reservoir carried on said motor vehicle;
   heating said rainwater stored in said rainwater reservoir;
   circulating hot exhaust gases from an internal combustion engine of said motor vehicle through a heat exchanger to heat said rainwater stored in said rainwater reservoir;
   monitoring a temperature of said rainwater in said rainwater reservoir; and
   directing, by a bypass valve, hot exhaust gases through a bypass conduit around said heat exchanger when said temperature of said rainwater in said rainwater reservoir is above a predetermined temperature.

7. The method of claim 6, including dispensing rainwater from said rainwater reservoir.

8. The method of claim 7, including filtering said rainwater, by a filter, prior to dispensing.

* * * * *